United States Patent [19]

Patel et al.

[11] Patent Number: 5,291,500
[45] Date of Patent: Mar. 1, 1994

[54] EIGHT-SAMPLE LOOK-AHEAD FOR CODED SIGNAL PROCESSING CHANNELS

[75] Inventors: Arvind M. Patel; Robert A. Rutledge, both of San Jose, Calif.

[73] Assignee: International Business Machines Corporation, Armonk, N.Y.

[21] Appl. No.: 526,878

[22] Filed: May 22, 1990

[51] Int. Cl.[5] .............................................. G06F 11/10
[52] U.S. Cl. ........................................ 371/65; 371/43; 371/57.1; 341/58; 358/261.2
[58] Field of Search ................. 371/43, 44, 45, 57.1, 371/65; 341/59, 58; 358/261.1, 261.2

[56] References Cited

U.S. PATENT DOCUMENTS

| | | | |
|---|---|---|---|
| 4,413,251 | 11/1983 | Adler et al. | 341/59 |
| 4,488,142 | 12/1984 | Franaszek | 341/59 |
| 4,945,538 | 7/1990 | Patel | 371/44 |

Primary Examiner—Robert W. Beausoliel
Assistant Examiner—Allen M. Lo
Attorney, Agent, or Firm—Henry E. Otto, Jr.

[57] ABSTRACT

A signal processing channel and method are described for processing digital sample values corresponding to an incoming analog signal representative of coded binary data. An eight-sample look-ahead algorithm is used to precompute the values of functional expressions for a baseline check and for a peak-position check. These precomputed values are compared against appropriate thresholds to provide respective binary decision outputs which, with state values corresponding to the current state, are used to determine state values for the next state, which become the current state values for the next iteration of the clock cycle. During each of a series of successive clock cycles, one successive bit of coded binary data corresponding to said current sample value is decoded, and at the next clock cycle, the computed next state becomes the new current state. Sensitivity to missing or extra-bit errors is minimized and full advantage of a (1,7) run-length-limited code constraint is achieved. A phase check is not necessary.

14 Claims, 4 Drawing Sheets

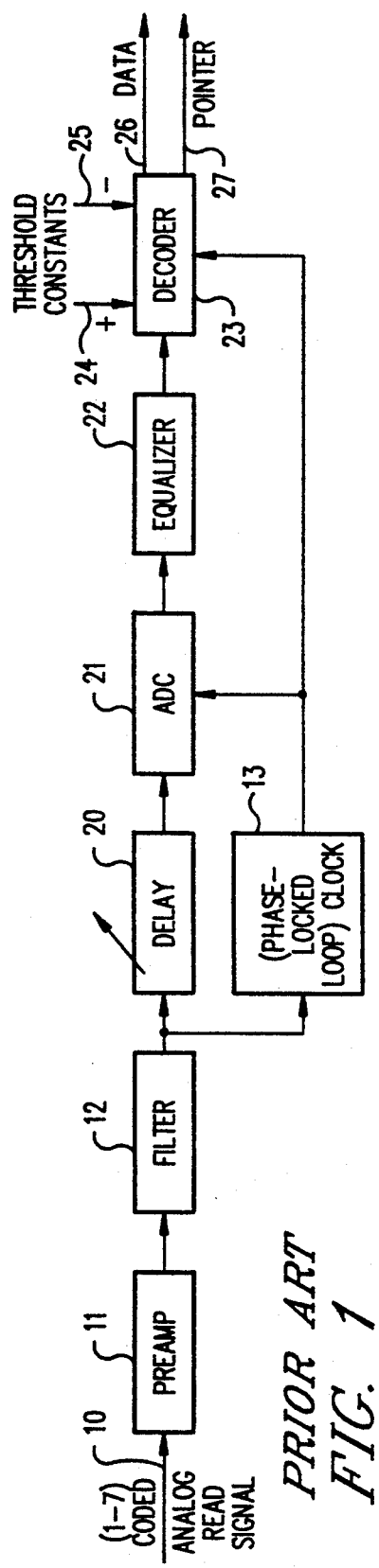
PRIOR ART
FIG. 1
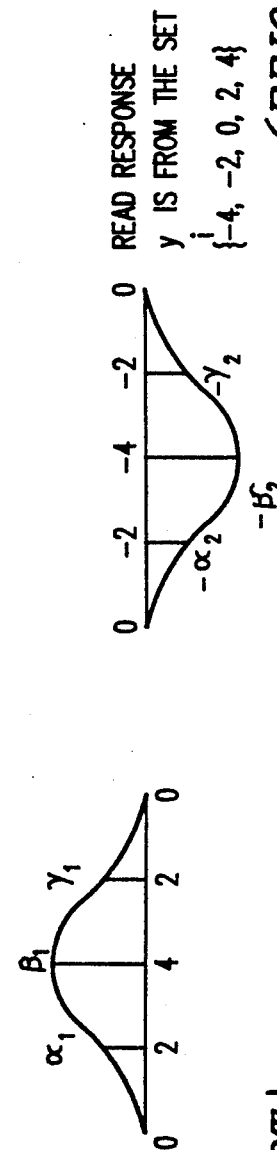
(PRIOR ART)
FIG. 2A
(PRIOR ART)
FIG. 2A'
(PRIOR ART)
FIG. 2B
(PRIOR ART)
FIG. 2B'

EIGHT-SAMPLE LOOK-AHEAD FOR CODED SIGNAL PROCESSING CHANNELS

This invention relates to a method and means for processing, in a coded signal processing channel, sample values representative of coded binary data, and more particularly relates to such a method and means employing an eight-sample look-ahead algorithm to minimize sensitivity to missing or for extra bit errors and to optimize the advantages of the code constraints of a (1,7) run-length-limited (RLL) code.

BACKGROUND OF THE INVENTION

The present invention describes an improvement to and extension of the channel signal processing method and means described in copending application U.S. Ser. No. 07/270,895, filed Nov. 14, 1988 and in the improvement thereto as described in copending application U.S. Ser. No. 07/470,020, filed Jan. 25, 1990.

The first cited copending application describes a five-sample look-ahead algorithm for processing sample values in a (1,7) coded partial response channel, when the pulse shapes are ideal; i.e., when the read response to the positive and negative magnetic transitions are the pulses with the sample values . . . ,0,2,4,2,0, . . . and . . . ,0,−2,−4,−2,0, . . . , respectively. It also shows how to adjust the test thresholds of the algorithm in order to accommodate variations in the pulse shape. The thresholds may be optimized empirically in response to the boundary crossings in actual test data. Alternatively, the thresholds can be expressed as a function of the sample values . . . ,0,$\alpha_1,\beta_1,\gamma_1$,0, . . . and . . . ,0,$-\alpha_2,-\beta_2,-\gamma_2$, 0, . . . in the positive and negative readback pulses.

A five-sample look-ahead algorithm was used for processing channel sample values $y_0,y_1,y_2,y_3,y_4$ to decode the current sample value $y_0$. This algorithm works well when all error modes are caused by similar noise circumstances. However, in specific applications, such as magnetic tape and optical recording, when the readback pulse is substantially reduced in amplitude during a media defect or distorted towards being too wide, the available distance is reduced for specific pairs of sequences of sample values. This increases the risk of peak shift errors, and the reliability performance of the decoder, in such case, is predominantly determined by the lower margin of error associated with these, sequences.

The second above-cited prior application describes an enhancement to the processing method just described. It involves precomputing a peak-position check including expressions using up to six-sample values $y_0-y_5$ ahead of the then current sample value $y_0$. Use of this six- (instead of five) sample look-ahead algorithm provides increased signal detection reliability and increased tolerance to readback pulse distortion by substantially reducing the exposure due to peak shift patterns. However, when these peak shift errors are removed, the primary concern shifts to patterns which are more sensitive to missing or extra bit errors, particularly in the presence of defects and nonlinearities.

A phase check is required in both of the above-cited signal processing methods in order to limit the propagation of detection errors.

There is a need for a signal processing method wherein this sensitivity to missing or extra bit errors can be minimized and wherein full advantage of a (1,7) run-length-limited code constraint can be achieved and the phase check can be eliminated.

SUMMARY OF THE INVENTION

Toward this end and according to the invention, an improved method and means employing an eight-sample look-ahead algorithm is disclosed for processing, in a signal processing channel, digital values corresponding to an incoming analog signal representative of coded binary data. An eight-sample look-ahead algorithm includes the following expressions for a baseline check:

$H_1 = y_0 + 2y_1 - 2y_3$ $H_2 = y_0 + 2y_1 + y_2 - y_3 - 2y_4$ $H_3 = y_0 + 2y_1 + y_2 - y_4 - 2y_5$ $H_4 = y_0 + 2y_1 + y_2 - y_5 - 2y_6$ $H_5 = y_0 + 2y_1 + y_2 - y_6 - 2y_7$ where $y_0$ is a then current sample value, and $y_1-y_7$ are sample values in successive later clock cycles following $y_0$. The algorithm is used during successive clock cycles to advance from a current state to a next state and to decode one successive bit of coded binary data corresponding to said sample value at each clock cycle.

The algorithm is used (1) to precompute the values of said expressions for the baseline check and also (2) to precompute the values of the following functional expressions for a peak-position check:

$H_6 = y_0 + y_1 - y_2 - y_3$ $H_7 = y_0 + y_1 - y_2 + 2y_4$ $H_8 = y_0 + y_1 - y_2 + y_4 - y_5;$

Said values are then compared against appropriate thresholds to provide respective binary decision outputs.

From these outputs in conjunction with state values corresponding to the current state, state values are determined for the next state, which become the current state values for the next iteration of the clock cycle. The algorithm is then used to decode one successive bit of coded binary data corresponding to said current sample value at each clock cycle.

BRIEF DESCRIPTION OF THE DRAWINGS

FIG. 1 is a schematic diagram of a prior art coded digital signal processing channel;

FIG. 2A and 2A' depict written transitions of magnitude 2 between +1 and −1 levels of magnetic saturation, and FIG. 2B and 2B' depict a read response normalized by a scaling factor to correspond to said written transitions, also as known in the prior art;

Figure 3:
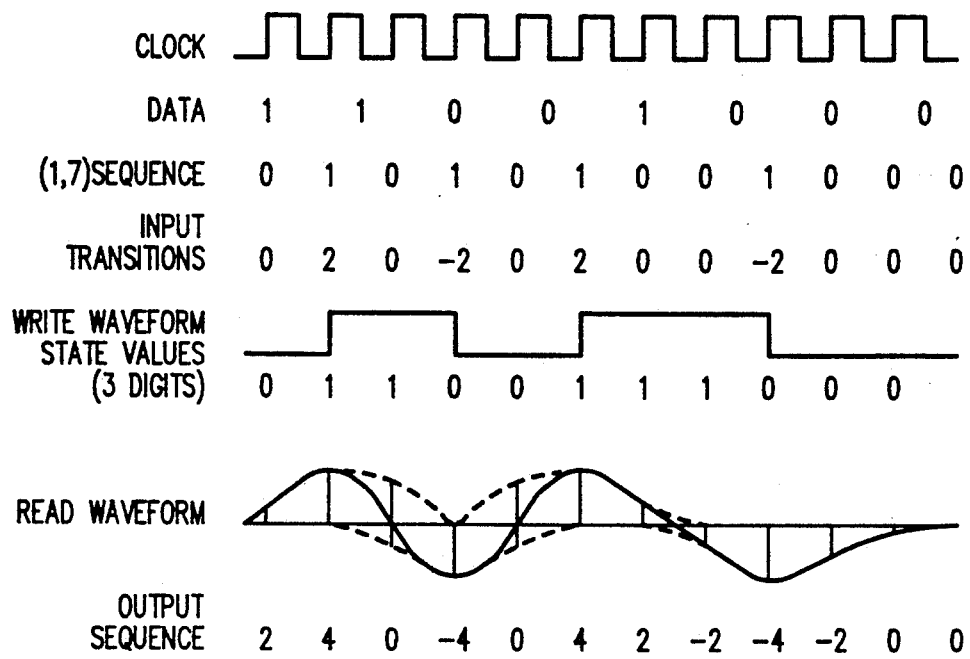
FIG. 3 shows write and read waveforms as known in the prior art for (1,7) coded data and read sample values.

Note that FIGS. 1, 2A, 2B and 3 are identical with figures of the same designation in both of the above-cited copending applications, and are provided as background to facilitate understanding of the invention.

BACKGROUND DESCRIPTION—PRIOR ART (FIGS. 1-3)

The following description from the first above-cited application is included in this section by way of background for more clearly explaining how the present invention is implemented.

As illustrated in FIG. 1, a signal processing channel includes a line 10 via which an analog read signal is fed from a transducer, such as a magnetic or optical read head in a digital storage device. This read signal corresponds to a recorded (1,7) data sequence, which is a binary data sequence coded with the (1,7) RLL code during the write operation. The read signal passes through a preamplifier 11 with automatic gain control (AGC) and a low bandpass filter 12. The output of filter 12 is supplied to a phase-locked clock 13 comprising a phase-locked loop timing recovery circuit including a variable frequency oscillator (VFO). This apparatus may be identical with that used in the conventional peak-detection channel with (1,7) code.

The channel is preferably of the type referred to as extended partial response maximum likelihood (EPRML) channel which is characterized by the polynomial $(1-D)(1+D)^2$. In EPRML signaling, the signal spectrum resembles a typical magnetic recording channel transfer function, desirably obviating the need for the notch filter required in the normal PRML channel characterized by the polynomial $(1-D)(1+D)$.

More specifically, the filter 12 and equalizer 22 operate to filter the read signal so that the response to a single magnetic transition is a pulse given by the sample values ..., 0, 2, 4, 2, 0, .... FIG. 2A depicts written transitions of magnitude 2 between +1 and −1 levels of magnetic saturation; and FIG. 2B depicts the read response that is normalized by a scaling factor to correspond thereto.

In the environment herein described, use of the (1,7) RLL code reduces crowding of write transitions on the media to ⅔ that experienced with the PRML or EPRML channel. The (1,7) code acts as a trellis code providing a built-in redundancy with its ⅔ rate. It is very tolerant to nonlinearities in a high-density, high-data-rate magnetic recording channel.

Briefly, the coded analog read signal output from filter 12 is supplied to a delay means 20. Delay means 20 may be a digital chip of the type which permits selectively adjustable delays in increments as low as a tenth of a nanosecond, depending upon the rate of the clock. Delay means 20 provides delay alignment between the analog signal and clock signal inputs to an analog-to-digital converter (ADC) 21. ADC 21 converts the analog input signal into digital sample values at successive clock times. These digital sample values, in some cases depending on the characteristic of filter 12, may be equalized by an equalizer 22. The digital sample values are then passed to a decoder 23. Positive and negative threshold constants are applied via lines 24,25, respectively, to decoder 23. Decoder 23 applies a decoding algorithm to the equalized digitized sample values to provide a coded binary data output in line 26 and, where appropriate, a pointer flag in line 27, at successive clock times under control of clock 13.

FIG. 3 depicts the write and read waveforms and associated sequences of data and sample values in a noise-free environment as they are clocked by clock 13. With the pulse shape as shown in FIGS. 2A,2B, the sample values, in accord with the decoder implementation, will range through the discrete set $\{-4, -2, 0, +2, +4\}$. Actual samples, however, will include signal anomalies and additive noise, and thus will range through various noninteger values around the integers in the discrete set.

The read clock is derived from read signal 10 using a conventional peak-detection circuit driving a variable frequency oscillator (VFO) with a phase-locked loop in the clock 13. As earlier noted, the ADC 21 under control of clock 13 converts the analog signal to digitized sample values at successive clock times; and the digitized sample values are equalized at 22.

DESCRIPTION OF PREFERRED EMBODIMENT

The apparatus thus far described is identical with that in the first above-cited application except that, in accordance with the invention, decoder 23 in that cited application is replaced by a decoder 40, shown in block diagram form in FIG. 4 and hereinafter to be described. Decoder 40 comprises precomputation device 41 depicted as a block in FIG. 4 but shown in greater detail in FIG. 5.

Figure 5:
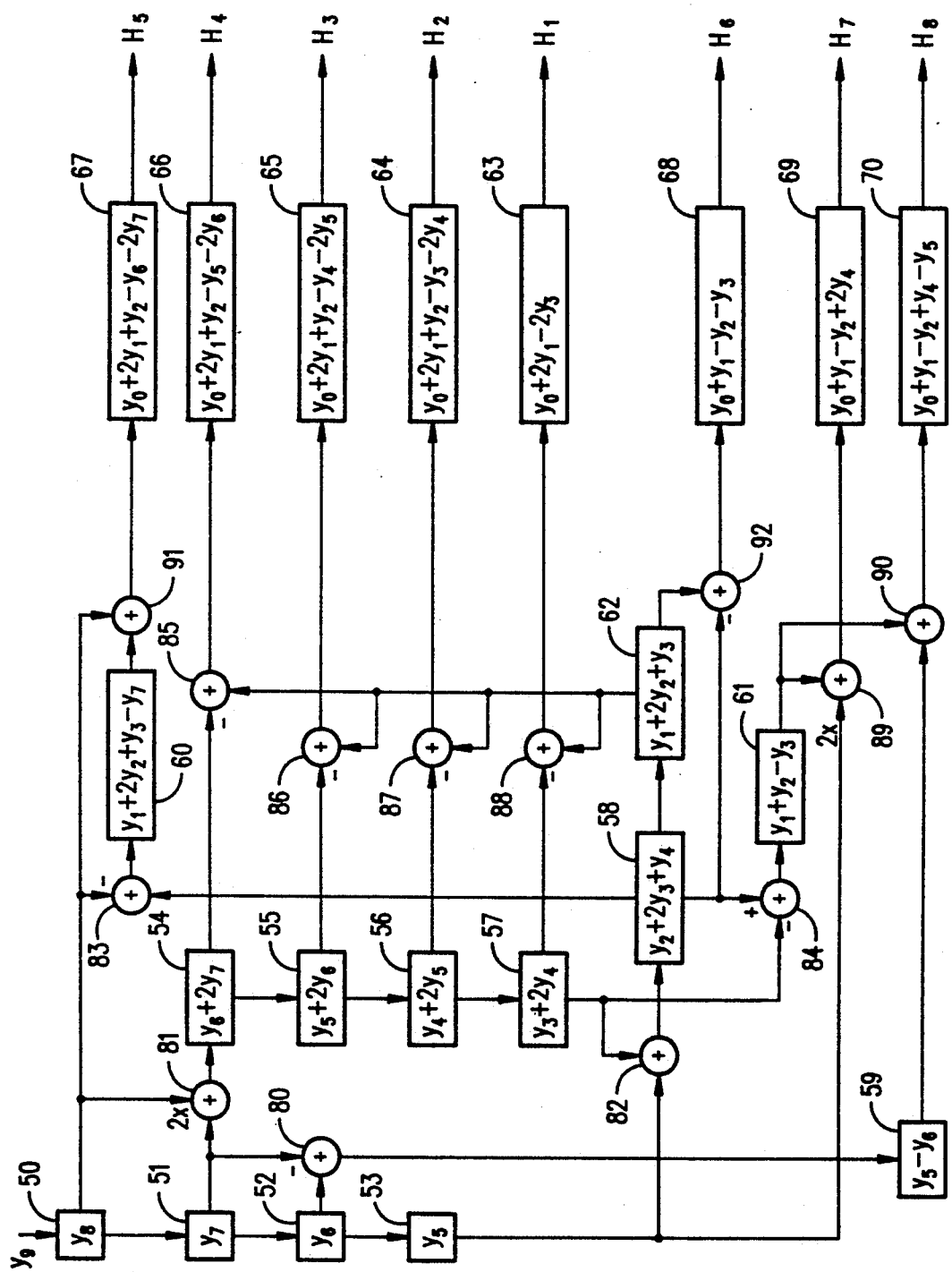
FIG. 5 is a schematic diagram showing specific details of the pipelined data flow through adders and registers of a precomputation device for precomputation of the values of functional expressions of sample values for decoding $y_0$.

Assume that $y_i$ denotes the digitized sample value corresponding to the $i^{th}$ clock cycle. Then, as illustrated in FIG. 5 hereof, the current value of $y_i$ is illustrated as $y_0$, corresponding to the current clock cycle i=0. Decoder 40 processes these digitized equalized sample values iteratively, through the precomputation circuits in FIG. 5, receiving one new sample per clock time with a look-ahead of eight-sample values. Thus, decoder 40 receives $y_{i+8}$ as it processes the previously received eight samples and decodes $y_i$ into the $i^{th}$ digit of the recorded sequences.

It should be noted that the decoding process is state dependent. The state of decoder 40 at the $i^{th}$ clock cycle is represented by a three digit binary number $a_ib_ic_i$, where $a_i$, $b_i$ and $c_i$ represent the binary logic levels of the write current (as illustrated in FIG. 3) for the last three bit values at the ith clock cycle. This identifies one of the six possible states, namely, 000, 100, 110, 111, 011, and 001. (The states 101 and 010 do not occur with (1,7) coded data employed in an EPRML channel). During each cycle of clock 13, decoder 40 determines one digit of the recorded (1,7) sequence and also identifies the next decoder state for processing of the next cycle.

THE DECODING ALGORITHM

Decoder 40 executes a novel eight-sample look-ahead algorithm using the test definitions and equations in Table A for decoding. Table A and the other Tables B-F are included in an Appendix hereto and made a part hereof. In this algorithm, the sample value that is currently being decoded is denoted by $y_0$, corresponding to the clock cycle i=0. The process is iterative and is driven by read clock 13.

Tables B and C tabulate the decoding rules for state transitions in positive phase and negative phase, respectively. As noted above, decoder 40 is state dependent; i.e., given the current state $a_0b_0c_0$ and sample values $y_0$, $y_1$, $y_2$, $y_3$, $y_4$, $y_5$, $y_6$ and $y_7$, the decoder determines the next state $a_1b_1c_1$. It also decodes this state into a data bit $d_0$ as a 1 or 0 (presence or absence of a magnetic transition) in the originally recorded (1,7) data sequence. The actual decision results from the outcome of the tests on the sample values as given by the equations in Tables A, B and C.

Tables B and C show how decoder 40 moves from one state to another in accordance with the combined outcome of the tests at each state. Note that the movement from one state to another is highly structured and that the form of the equations is very simple and similar at various states. The states 110, 100 and 000 (Table B) corresponding to the positive phase of the signal have mirror image symmetry with states 001, 011, and 111 respectively (Table C) corresponding to the negative phase of the signal. The mirror image symmetry is characterized by the same structure with a change in the sign for all expressions of the sample values in the corresponding states of the two phases as seen in Tables A, B and C.

The decisions of decoder 40 are driven by the outcome of two basic checks: namely, (i) a baseline check; and (ii) a peak-position check. The outcomes of these checks are represented in the form of Boolean variables denoted by $G_1$ and $G_2$ for the baseline check; and by $Q_1$ and $Q_2$ for the peak-position check.

According to a feature of the invention, $G_1$ and $G_2$ are logical functions of more specific checks represented by newly added Boolean variables $A_1$, $B_1$, $C_1$, $D_1$, $E_1$, $F_1$, $M_1$, $N_1$ and $A_2$, $B_2$, $C_2$, $D_2$, $E_2$, $F_2$, $M_2$, $N_2$ which use up to eight look-ahead sample values; namely, $y_0$, $y_1$, $y_2$, $y_3$, $y_4$, $y_5$, $y_6$ and $y_7$ in their functional expressions. These functional expressions represent precomputed functions of sample values for the baseline check. These functional expressions are denoted as $H_1$, $H_2$, $H_3$, $H_4$ and $H_5$ and are identified in the first column of Table A which sets forth the test definitions and equations for decoding.

According to the invention, the functional expressions $H_1$, $H_2$, $H_3$, $H_4$, $H_5$ for the baseline check are given by $$H_1 = y_0 + 2y_1 - 2y_3 \quad (1)$$

$$H_2 = y_0 + 2y_1 + y_2 - y_3 - 2y_4 \quad (2)$$

$$H_3 = y_0 + 2y_1 + y_2 - y_4 - 2y_5 \quad (3)$$

$$H_4 = y_0 + 2y_1 + y_2 - y_5 - 2y_6 \quad (4)$$

$$H_5 = y_0 + 2y_1 + y_2 - y_6 - 2y_7 \quad (5)$$

$Q_1$ and $Q_2$ are logic functions of more specific checks represented by $X_1$, $X_2$, $Y_1$, $Y_2$, and also by a modified $Z_1, Z_2$ and by a newly added $W_1$ and $W_2$ which, as described in the second cited copending application, use up to six look-ahead sample values (namely, $y_0$, $y_1$, $y_2$, $y_3$, $y_4$ and $y_5$) in their functional expressions. These functional expressions are denoted as $H_6$, $H_7$ and $H_8$ and are identified in the first column of Table A as precomputed functions of sample values for the peak-position check.

The functional expressions $H_6$, $H_7$, $H_8$ for the peak-position check are given by $$H_6 = y_0 + y_1 - y_2 - y_3 \quad (6)$$

$$H_7 = y_0 + y_1 - y_2 + 2y_4 \quad (7)$$

$$H_8 = y_0 + y_1 - y_2 + y_4 - y_5 \quad (8)$$

In the above-cited two applications, a phase check was used in order to limit the propagation of detection errors. According to another feature of the invention, the phase check is eliminated and error propagation is controlled by the new baseline check with eight-sample look-ahead and the run-length constraint of the (1,7) code.

Each check is a comparison of a specific function (from the set $H_1$ through $H_8$) of the sample values against a fixed threshold. Each threshold is represented by a corresponding constant that is strongly related to the shape of the readback signal and defined by the right-hand side of the corresponding test equation. In the following test equations, the threshold constants correspond to the nominal pulse shape with sample values . . . , 0, 2, 4, 2, 0, . . . and . . . , 0, −2, −4, −2, 0, . . . as illustrated in FIG. 2B.

(i) Baseline Check ($G_1$ and $G_2$)

$$G_1 = A_1 M_1 (B_1 + C_1 + D_1 + E_1 + N_1 F_1) \quad (9)$$

$$G_2 = A_2 M_2 (B_2 + C_2 + D_2 + E_2 + N_2 F_2) \quad (10)$$

where $$A_1 = 1 \text{ implies } H_1 \leq 7 \quad (11)$$

$$M_1 = 1 \text{ implies } H_2 \leq 9 \quad (12)$$

$$N_1 = 1 \text{ implies } H_3 \leq 9 \quad (13)$$

$$B_1 = 1 \text{ implies } H_1 \leq -1 \quad (14)$$

$$C_1 = 1 \text{ implies } H_2 \leq -1 \quad (15)$$

$$D_1 = 1 \text{ implies } H_3 \leq -1 \quad (16)$$

$$E_1 = 1 \text{ implies } H_4 \leq -1 \quad (17)$$

$$F_1 = 1 \text{ implies } H_5 \leq -1 \quad (18)$$

and $$A_2 = 1 \text{ implies } H_1 \leq 9 \quad (19)$$

$$M_2 = 1 \text{ implies } H_2 \leq 11 \quad (20)$$

$$N_2 = 1 \text{ implies } H_3 \leq 11 \quad (21)$$

$$B_2 = 1 \text{ implies } H_1 \leq 1 \quad (22)$$

$$C_2 = 1 \text{ implies } H_2 \leq 1 \quad (23)$$

$$D_2 = 1 \text{ implies } H_3 \leq 1 \quad (24)$$

$$E_2 = 1 \text{ implies } H_4 \leq 1 \quad (25)$$

$$F_2 = 1 \text{ implies } H_5 \leq 1 \quad (26)$$

(ii) Peak-Position Check ($Q_1$ and $Q_2$)

$$Q_1 = X_1 + Y_1 Z_1 W_1 \qquad (27)$$

$$Q_2 = X_2 + Y_2 Z_2 W_2 \qquad (28)$$

where $$X_1 = 1 \text{ implies } H_6 \leq -2 \qquad (29)$$

$$Y_1 = 1 \text{ implies } H_6 \leq 0 \qquad (30)$$

$$Z_1 = 1 \text{ implies } H_7 \leq -5 \qquad (31)$$

$$W_1 = 1 \text{ implies } H_8 \leq -1 \qquad (32)$$

and $$X_2 = 1 \text{ implies } H_6 \leq 0 \qquad (33)$$

$$Y_2 = 1 \text{ implies } H_6 \leq 2 \qquad (34)$$

$$Z_2 = 1 \text{ implies } H_7 \leq -3 \qquad (35)$$

$$W_2 = 1 \text{ implies } H_8 \leq 1 \qquad (36)$$

Note that the baseline check is very different from those described in either of the above cited applications. In the improved baseline check, all expressions [(1) to (5)] and checks [(9) to (26)] are new, making use of additional information from an eight-sample look-ahead. In the peak-position check, however, formulae (27) and (28) for $Q_1$ and $Q_2$, formulae (31) and (35) for $Z_1$ and $Z_2$, and formulae (32) and (36) for $W_1$ and $W_2$ are essentially similar to those in the second cited application, making use of six-sample look-ahead.

The five functions, $H_1, \ldots, H_5$ that now replace the two baseline check equations in both the cited prior applications increase the available square distance by 50% as seen by the extra-bit and missing-bit errors through the baseline check. With these more powerful equations, extra bit and missing-bit errors become extremely unlikely. Furthermore, if an extra-bit or missing-bit error occurs, then the baseline check includes specific functions that return the decoder to correct phase well within the seven-digit run-length constraint of the (1,7) code. Thus, a phase check is not required and is eliminated from decoder 40.

The above tests [Equations (9) through (36)] correspond to the states 100 and 000 in the positive phase of the signal. The same tests with a sign change to all expressions [(1) through (8)] of the sample values are used for the states 011 and 111 in the negative phase of the signal. This is shown in further detail in Table A.

Figure 4:
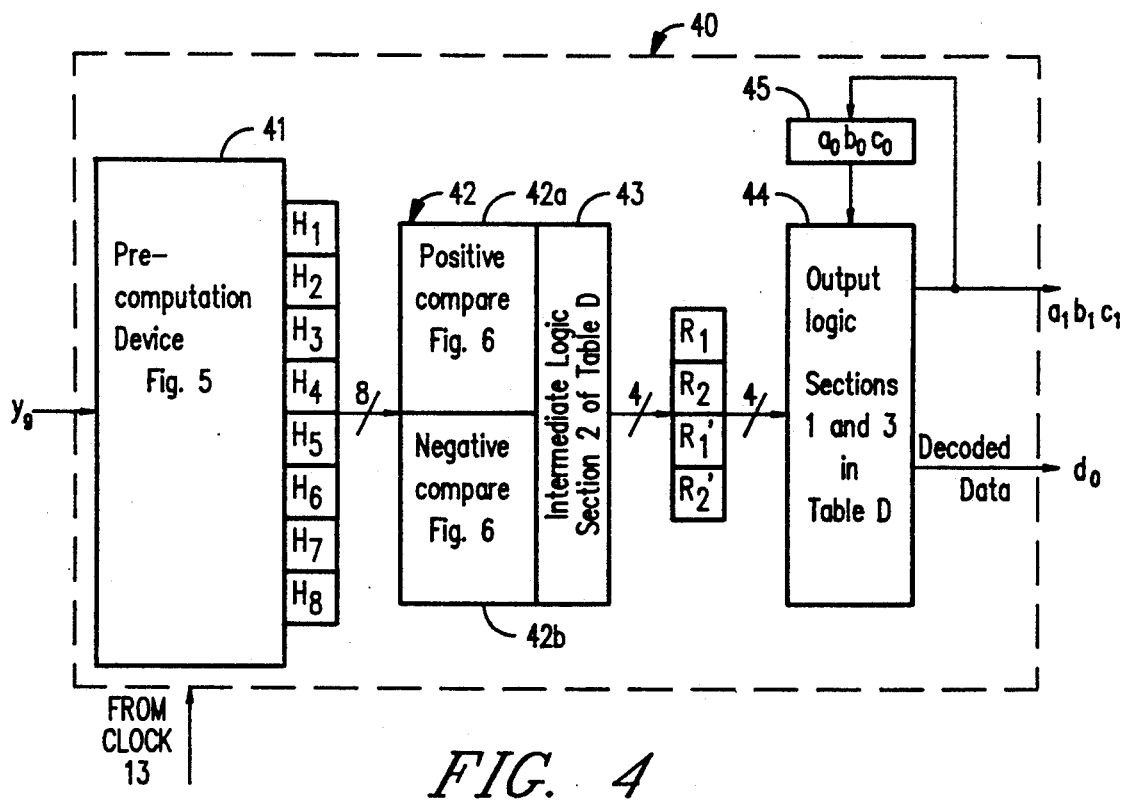
FIG. 4 is a block diagram of a decoder embodying an eight-sample look-ahead feature and decision boundaries for implementing the invention.

As earlier noted and as illustrated in FIG. 4, decoder 40 comprises the precomputation device 41 (shown in FIG. 5) for precomputing the two groups of functional expressions $H_1$–$H_5$ and $H_6$–$H_8$, for the baseline check and the peak-position check, respectively, listed in Table A using up to eight look-ahead sample values. Device 41 operates during each decoder cycle to move data one bit at a time from one register to the next with a pipelined network of registers and adders to provide the precomputed functional expressions $H_1$–$H_8$ for the baseline check and peak-position check. Each of these expressions $H_1$–$H_8$ is compared against positive and negative thresholds 42a,42b of a respective comparator logic circuit 42 (shown in greater detail in FIG. 6). The outputs from each circuit 42 are passed to intermediate logic 43 which uses the logic in section 2 of Table D to compute $R_1, R_2, R_1', R_2'$. These intermediate variables together with the state values $a_0, b_0, c_0$ from register 45 are used by output logic block 44, applying the logic in sections 1 and 3 of Table D.

Figure 6:
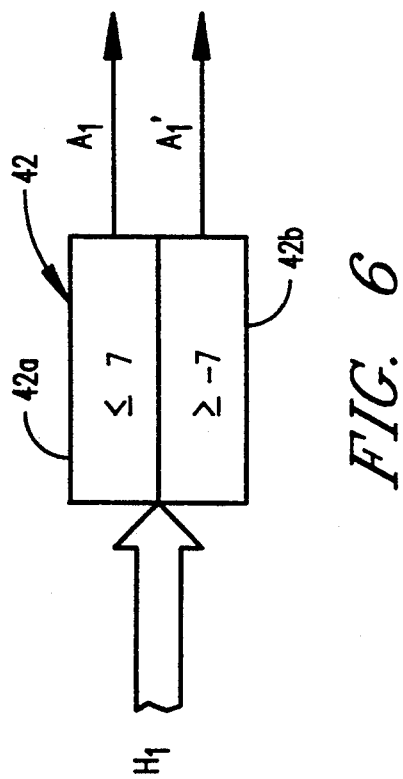
FIG. 6 is a schematic diagram of a comparator circuit with constant positive and negative threshold values.

Refer now to FIG. 5 for a more detailed explanation of precomputing device 41. Device 41 comprises twenty-one registers 50–70 which hold the respective interim functions of the sample values $y_0$ through $y_7$. During each cycle, the content of each register 50–70 is moved in the direction of the arrow to the next register as appropriate functions are created through thirteen adder circuits 80–92. The outputs $H_1, H_2, \ldots, H_8$ from each of the respective eight registers 63–70 are fed to a corresponding comparator circuit 42 having constant positive and negative threshold values. As illustrated in FIG. 6, for example, the value of $H_1$ is compared against two fixed thresholds in the comparator circuit 42 and the two outputs correspond to those for the variables $A_1$, and $A_1'$, in expression (11) and its counterpart for the negative phase. The sign change for the negative phase of $H_1$ is not required because $(-H_1 \leq 7)$ can be also implemented as $(H_1 \geq -7)$. There is one such comparator circuit for each of the variables $A_1, M_1, N_1, B_1, C_1, D_1, E_1, F_1, A_2, M_2, N_2, B_2, C_2, D_2, E_2$, and $F_2$ of equations (11)–(26), and for the variables $X_1, X_2, Y_1, Y_2, Z_1, Z_2, W_1$ and $W_2$, of equations (29)–(36). The outputs from the respective comparator circuits 42 are values "1" or "0" which are combined in accordance with the intermediate logic 43 (given in Section 2 of Table D) to generate the intermediate variables $R_1, R_2, R_1'$ and $R_2'$. These variables, together with the state values $a_0, b_0, c_0$ from register 45, are used by the output logic block 44.

The output logic block 44 provides the decoded data $d_0$ corresponding to state $a_0 b_0 c_0$ in accordance with the logic of section 1 of Table D. Block 44 also creates the state value $a_1 b_1 c_1$ for the next state in accordance with the logic of section 3 in Table D. This state value is supplied to state register 45 to become the current state value $a_0 b_0 c_0$ for the next clock cycle.

PROGRAMMABLE OR ADAPTIVE DECODING

Table 4 in the first cited prior application provided programmed values for thresholds in terms of signal shape given by the general parameters $\alpha_1, \beta_1, \gamma_1, -\alpha_2, -\beta_2, -\gamma_2$. Table E of the present application provides similar programmed values for thresholds for all the equations corresponding to the variables A, B, C, D, E, F, M, N, X, Y, Z and W.

In Table E and in the following description, a plus sign and minus sign are used to denote constants for the positive phase and the negative phase, respectively; whereas primed and nonprimed variable names are used to indicate variables for positive and negative phase, respectively. For example, the test corresponding to Boolean variable Al will use the constant $KA_1^+$ for the state 100 in the positive phase and the test corresponding to Boolean variable $A_1'$ will use the constant $KA_1^-$ for the state 011 in the negative phase.

Figure 7:
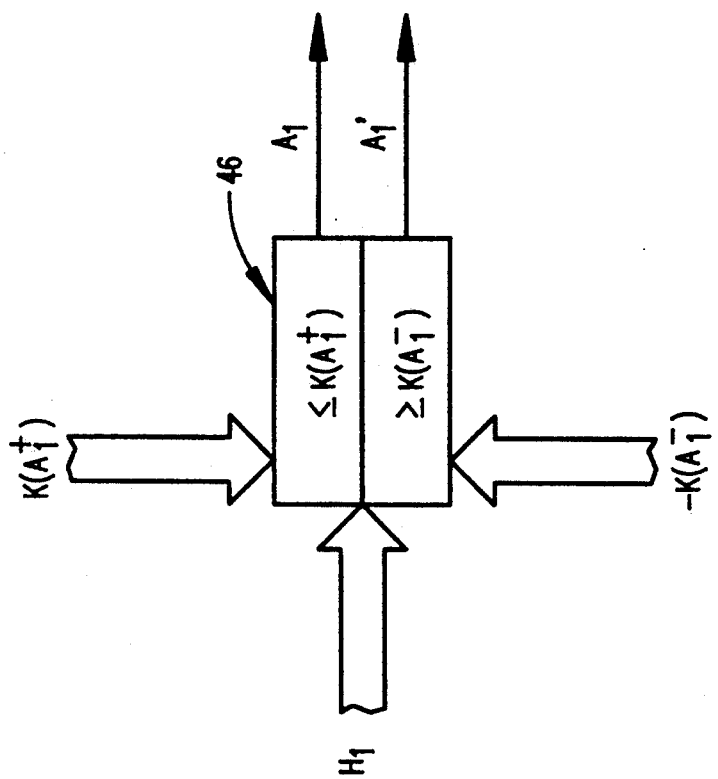
FIG. 7 is a schematic diagram of a comparator circuit with programmable positive and negative threshold values to provide a programmable decoder that adjusts to variations in analog input signal shape.

To implement programmability, each comparator circuit 42 of FIG. 6 is replaced by a corresponding comparator circuit 46 illustrated in FIG. 7 as corresponding to the Boolean variable $A_1$. This circuit 46 is supplied with two separate values for the constant operand, namely $KA_1^+$ and $KA_1^-$, and the output will be Boolean variables $A_1$ and $A_1'$ corresponding to state 100 and state 011, respectively, as shown in FIG. 7. The sign change for negative phase is not required because $(-H_1 \leq KA_1^-)$ can be also implemented as $(_1 \geq -KA_1^-)$. The comparator circuit 46 for each of the other twenty-five Boolean variables will be similarly modified to receive two separate values for the constant operand, and the output will be two Boolean variables (the original and the primed) which, in each case, correspond to the states in the positive phase ($c_0=0$) and negative phase ($c_0=1$), respectively.

When anomalies in the signal shape cannot be compensated for by a filter and an equalizer, such as 12 and 22, programmable decoder 40 provides an easy means to compensate for misequalization by adjusting the thresholds in the two phases of the decoder. This flexibility permits operating decoder 40 at near-optimum performance even in the absence of ideal shape of the readback signal. In disk recording systems, this is especially important because the programmability of the decoder can be used to change threshold constants at different tracks or bands of tracks and obtain near-optimum performance at all tracks.

In tape recording systems, media defects on the magnetic recording tape cause signal dropouts. The severity and size of such dropouts depend on the age and usage of the tape and also on the position of the recording track relative to the edge of the tape. The programmability of the decoder, especially the thresholds for the new baseline checks, is very useful in accommodating these large variations in media quality.

The programmability of decoder 40 also enables it to continuously adaptively adjust digital parameters in the decoder. More specifically, the estimated sample values at the output of decoder 40 can be monitored in comparison with the received sample values. When averaged over a preselected number of like sample values, the signal shape can be characterized in terms of the parameters $\alpha_1, \beta_1, \gamma_1, -\alpha_2, -\beta_2, -\gamma_2$. This information can be used to obtain the corresponding threshold constants Table E) and adaptively adjust the decoder for variations in the signal shape.

If desired, threshold values for decoder 40 can be easily verified through an extensive amount of testing, and then be adjusted in accordance with the empirical results to accommodate specific anomalies in the signal.

In particular, the first set of preselected thresholds corresponding to the baseline checks $A_1, M_1, N_1, B_1, C_1, D_1, E_1, F_1, A_2, M_2, N_2, B_2, C_2, D_2, E_2, F_2$, and their counterpart checks in the negative phase, is used for controlling the missing bit and extra bit errors caused by media defects-related anomalies in the incoming analog signal; and the second set of preselected thresholds corresponding to the peak-position checks $X_1, X_2, Y_1, Y_2, Z_1, Z_2, W_1, W_2$ and their counterparts in the negative phase, is used for controlling peak shift errors caused by nonlinearities-related anomalies in said signal.

SIMPLIFICATIONS TO REDUCE HARDWARE

The baseline check herein disclosed is very powerful in terms of the available distance at various checks. In fact, the available distance for the baseline check is at least 2.25 times the minimum distance for the overall detection process. Among these, the variables $A_1$, $A_2$, $B_1$, $B_2$ (and their counterparts in negative phase, as defined in Table A) have the smallest distance which may be called the minimum distance for a baseline check, affecting the missing-bit and extra-bit errors.

Figure 8:
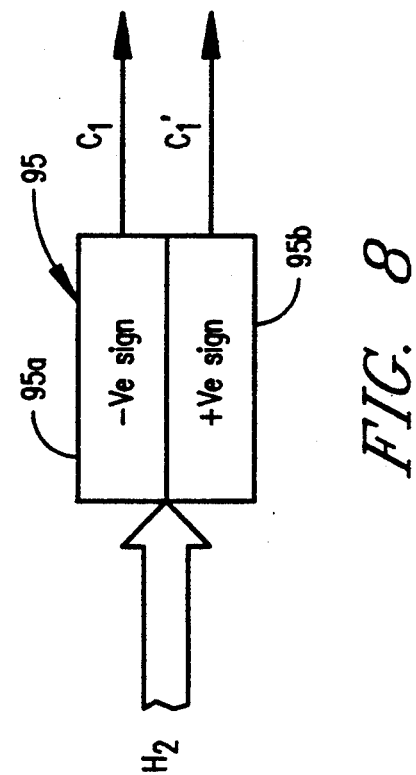
FIG. 8 is a schematic diagram of a comparator having thresholds at zero such that the output is determined by the sign of the input.

Since the remaining variables in the baseline check have larger distance, the complexity and amount of hardware can desirably be reduced without reducing the minimum distance of the baseline check. The thresholds corresponding to variables $C_1, D_1, E_1, F_1, C_2, D_2, E_2, F_2$ (and their counterparts in the negative phase) are near zero, as shown in Table A. In order to achieve the simplification, these thresholds are fixed and intentionally made not programmable so that they can be implemented without requiring a respective comparator circuit 42. With the thresholds fixed around zero, the output is determined by sensing the sign bit of the input with a sensing circuit 95 as shown in FIG. 8. This desirably will eliminate eight pairs of comparator circuits 42 or 46 and eight pairs of storage units for the threshold constants, and substitute only the four pairs 95a,95b of sign-bit sensing circuits 95 of FIG. 8—one such pair corresponding to each variable C, D, E and F.

In addition, the thresholds corresponding to the variables $M_1, N_1, M_2, N_2$ are made same as the programmable threshold for the variable $A_2$, and the thresholds corresponding to the variables $M_1', N_1', M_2', N_2'$ are made the same as the programmable threshold for the variable $A_2'$. This eliminates the need for eight storage units for storing threshold constants and also eliminates the need for four comparators because the variables $M_1$, $N_1$, $M_1'$ and $N_1'$ will now be identical with the variables $M_2, N_2, M_2'$ and $N_2'$, respectively. These changes are summarized in Table F.

While the invention has been shown and described with respect to preferred embodiments thereof, it will be understood by those skilled in the art that changes in form and detail may be made in these embodiments without departing from the scope and teaching of the invention. Accordingly, the method and means herein disclosed are to be considered merely as illustrative, and the invention is to be limited only as specified in the claims.

TABLE A

APPENDIX
Test Definitions and Equations for Decoding

| Precomputed Functions of Sample Values | Positive Phase Decision Boundary at State 1 0 0 | Decision Boundary at State 0 0 0 | Negative Phase Decision Boundary at State 0 1 1 |
|---|---|---|---|
| Baseline Check | $G_1 = A_1M_1(B_1 + C_1 + D_1 + E_1 + N_1F_1)$ | $G_2 = A_2M_2(B_2 + C_2 + D_2 + E_2 + N_2F_2)$ | $G_1' = A_1'M_1'(B_1' + C_1' + D_1' + E_1' + N_1'F_1')$ |
| $H_1 = y_0 + 2y_1 - 2y_3$ | $A_1 = (H_1 \leq 7)$ | $A_2 = (H_1 \leq 9)$ | $A_1' = (-H_1 \leq 7)$ |
| | $B_1 = (H_1 \leq -1)$ | $B_2 = (H_1 \leq 1)$ | $B_1' = (-H_1 \leq -1)$ |
| $H_2 = y_0 + 2y_1 + y_2 - y_3 - 2y_4$ | $M_1 = (H_2 \leq 9)$ | $M_2 = (H_2 \leq 11)$ | $M_1' = (-H_2 \leq 9)$ |
| | $C_1 = (H_2 \leq -1)$ | $C_2 = (H_2 \leq 1)$ | $C_1' = (-H_2 \leq -1)$ |
| $H_3 = y_0 + 2y_1 + y_2 - y_4 - 2y_5$ | $N_1 = (H_3 \leq 9)$ | $N_2 = (H_3 \leq 11)$ | $N_1' = (-H_3 \leq 9)$ |
| | $D_1 = (H_3 \leq -1)$ | $D_2 = (H_3 \leq 1)$ | $D_1' = (-H_3 \leq -1)$ |
| $H_4 = y_0 + 2y_1 + y_2 - y_5 - 2y_6$ | $E_1 = (H_4 \leq -1)$ | $E_2 = (H_4 \leq 1)$ | $E_1' = (-H_4 \leq -1)$ |
| $H_5 = y_0 + 2y_1 + y_2 - y_6 - 2y_7$ | $F_1 = (H_5 \leq -1)$ | $F_2 = (H_5 \leq 1)$ | $F_1' = (-H_5 \leq -1)$ |
| Peak Position Check | $Q_1 = X_1 + Y_1Z_1W_1$ | $Q_2 = X_2 + Y_2Z_2W_2$ | $Q_1' = X_1' + Y_1'Z_1'W_1'$ |
| $H_6 = y_0 + y_1 - y_2 - y_3$ | $X_1 = (H_6 \leq -2)$ | $X_2 = (H_6 \leq 0)$ | $X_1' = (-H_6 \leq -2)$ |

TABLE A-continued

APPENDIX
Test Definitions and Equations for Decoding

| | | | |
|---|---|---|---|
| $H_7 = y_0 + y_1 - y_2 + 2y_4$ | $Y_1 = (H_6 \leq 0)$ | $Y_2 = (H_6 \leq 2)$ | $Y_1' = (-H_6 \leq 0)$ |
| $H_8 = y_0 + y_1 - y_2 + y_4 - y_5$ | $Z_1 = (H_7 \leq -5)$ | $Z_2 = (H_7 \leq -3)$ | $Z_1' = (-H_7 \leq -5)$ |
| | $W_1 = (H_8 \leq -1)$ | $W_2 = (H_8 \leq 1)$ | $W_1' = (-H_8 \leq -1)$ |

| | Precomputed Functions of Sample Values | Negative Phase Decision Boundary at State 1 1 1 |
|---|---|---|
| | Baseline Check | $G_2' = A_2'M_2'(B_2' + C_2' + D_2' + E_2' + N_2'F_2')$ |
| | $H_1 = y_0 + 2y_1 - 2y_3$ | $A_2' = (-H_1 \leq 9)$ |
| | | $B_2' = (-H_1 \leq 1)$ |
| | $H_2 = y_0 + 2y_1 + y_2 - y_3 - 2y_4$ | $M_2' = (-H_2 \leq 11)$ |
| | | $C_2' = (-H_2 \leq 1)$ |
| | $H_3 = y_0 + 2y_1 + y_2 - y_4 - 2y_5$ | $N_2' = (-H_3 \leq 11)$ |
| | | $D_2' = (-H_3 \leq 1)$ |
| | $H_4 = y_0 + 2y_1 + y_2 - y_5 - 2y_6$ | $E_2' = (-H_4 \leq 1)$ |
| | $H_5 = y_0 + 2y_1 + y_2 - y_6 - 2y_7$ | $F_2' = (-H_5 \leq 1)$ |
| | Peak Position Check | $Q_2' = X_2' + Y_2'Z_2'W_2'$ |
| | $H_6 = y_0 + y_1 - y_2 - y_3$ | $X_2' = (-H_6 \leq 0)$ |
| | | $Y_2' = (-H_6 \leq 2)$ |
| | $H_7 = y_0 + y_1 - y_2 + 2y_4$ | $Z_2' = (-H_7 \leq -3)$ |
| | $H_8 = y_0 + y_1 - y_2 + y_4 - y_5$ | $W_2' = (-H_8 \leq 1)$ |

TABLE B

Decoding Rules for State Transitions in Positive Phase

| Current State | | Results of Tests on Sample Values | Decoded | Next State | |
|---|---|---|---|---|---|
| $a_0 b_0 c_0$ | $\tilde{y}_{-1}$ | $y_0, y_1, y_2, y_3, y_4, y_5, y_6, y_7$ | Data | $a_1 b_1 c_1$ | $\tilde{y}_0$ |
| 1 1 0 | −2 or 0 | None | 1 | 1 0 0 | −4 |
| 1 0 0 | −4 | $(G_1 + Q_1) = 1$ | 0 | 0 0 0 | −2 |
| | | Otherwise | 0 | 0 0 1 | 0 |
| 0 0 0 | 0 or −2 | $(G_2 + Q_2) = 1$ | 0 | 0 0 0 | 0 |
| | | Otherwise | 0 | 0 0 1 | 2 |

TABLE C

Decoding Rules for State Transitions in Negative Phase

| Current State | | Results of Tests on Sample Values | Decoded | Next State | |
|---|---|---|---|---|---|
| $a_0 b_0 c_0$ | $\tilde{y}_{-1}$ | $y_0, y_1, y_2, y_3, y_4, y_5, y_6, y_7$ | Data | $a_1 b_1 c_1$ | $\tilde{y}_0$ |
| 0 0 1 | 2 or 0 | None | 1 | 0 1 1 | 4 |
| 0 1 1 | 4 | $(G_1' + Q_1') = 1$ | 0 | 1 1 1 | 2 |
| | | Otherwise | 0 | 1 1 0 | 0 |
| 1 1 1 | 0 or 2 | $(G_2' + Q_2') = 1$ | 0 | 1 1 1 | 0 |
| | | Otherwise | 0 | 1 1 0 | −2 |

TABLE D

Intermediate Logic and Output Logic

1. Decoded Data.
$d_0 = b_0\overline{c_0} + \overline{b_0}c_0$
2. Intermediate Logic.
$R_1 = G_1 + Q_1 = A_1M_1(B_1 + C_1 + D_1 + E_1 + N_1F_1) + X_1 + Y_1Z_1W_1$
$R_2 = G_2 + Q_2 = A_2M_2(B_2 + C_2 + D_2 + E_2 + N_2F_2) + X_2 + Y_2Z_2W_2$
$R_1' = G_1' + Q_1' = A_1'M_1'(B_1' + C_1' + D_1' + E_1' + N_1'F_1') + X_1' + Y_1'Z_1'W_1'$
$R_2' = G_2' + Q_2' = A_2'M_2'(B_2' + C_2' + D_2' + E_2' + N_2'F_2') + X_2' + Y_2'Z_2'W_2'$
3. Next State.
$a_1 = b_0$
$b_1 = c_0$
$c_1 = \overline{b_0}c_0 + \overline{R_1}a_0b_0 + \overline{R_2}\overline{a_0}\overline{c_0} + R_1'\overline{a_0}b_0 + R_2'a_0c_0$

TABLE E

Programmed Values for Test Thresholds [Nominal Values]

| | Positive Phase | | | |
|---|---|---|---|---|
| Test | State 1 0 0 | | State 0 0 0 | |
| Baseline Check | | | | |
| A | $KA_1^+ = KA_2^+ - \gamma_2$ | [7] | $KA_2^+ = \beta_1 + \beta_2 + \alpha_1/2$ | [9] |
| B | $KB_1^+ = KB_2^+ - \gamma_2$ | [−1] | $KB_2^+ = \alpha_1/2$ | [1] |
| M | $KM_1^+ = KM_2^+ - \gamma_2$ | [9] | $KM_2^+ = KA_2^+ + (\gamma_1 + \alpha_2)/2$ | [11] |
| C | $KC_1^+ = KC_2^+ - \gamma_2$ | [−1] | $KC_2^+ = \gamma_1/2$ | [1] |
| N | $KN_1^+ = KM_1^+$ | [9] | $KN_2^+ = KM_2^+$ | [11] |

TABLE E-continued

Programmed Values for Test Thresholds [Nominal Values]

| | | | | | |
|---|---|---|---|---|---|
| D | $KD_1^+ = KC_1^+$ | [−1] | $KD_2^+ = KC_2^+$ | [1] | |
| E | $KE_1^+ = KC_1^+$ | [−1] | $KE_2^+ = KC_2^+$ | [1] | |
| F | $KF_1^+ = KC_1^+$ | [−1] | $KF_2^+ = KC_2^+$ | [1] | |

Peak Position Check

| | | | | | |
|---|---|---|---|---|---|
| X | $KX_1^+ = KX_2^+ - \gamma_2$ | [−2] | $KX_2^+ = \alpha_1 - \gamma_1$ | [0] | |
| Y | $KY_1^+ = KY_2^+ - \gamma_2$ | [0] | $KY_2^+ = \alpha_2 + \alpha_1 - \gamma_1$ | [2] | |
| Z | $KZ_1^+ = KZ_2^+ - \gamma_2$ | [−5] | $KZ_2^+ = \alpha_1 - \beta_2 - \gamma_1/2$ | [−3] | |
| W | $KW_1^+ = KW_2^+ - \gamma_2$ | [−1] | $KW_2^+ = \alpha_1 + (\gamma_2 - \gamma_1 - \alpha_2)/2$ | [1] | |

Negative Phase

| Test | State 0 1 1 | | State 1 1 1 | |
|---|---|---|---|---|

Baseline Check

| | | | | |
|---|---|---|---|---|
| A | $KA_1^- = KA_2^- - \gamma_1$ | [7] | $KA_2^- = \beta_2 + \beta_1 + \alpha_2/2$ | [9] |
| B | $KB_1^- = KB_2^- - \gamma_1$ | [−1] | $KB_2^- = \alpha_2/2$ | [1] |
| M | $KM_1^- = KM_2^- - \gamma_1$ | [9] | $KM_2^- = KA_2^- + (\gamma_2 + \alpha_1)/2$ | [11] |
| C | $KC_1^- = KC_2^- - \gamma_1$ | [−1] | $KC_2^- = \gamma_2/2$ | [1] |
| N | $KN_1^- = KM_1^-$ | [9] | $KN_2^- = KM_2^-$ | [11] |
| D | $KD_1^- = KC_1^-$ | [−1] | $KD_2^- = KC_2^-$ | [1] |
| E | $KE_1^- = KC_1^-$ | [−1] | $KE_2^- = KC_2^-$ | [1] |
| F | $KF_1^- = KC_1^-$ | [−1] | $KF_2^- = KC_2^-$ | [1] |

Peak Position Check

| | | | | |
|---|---|---|---|---|
| X | $KX_1^- = KX_2^- - \gamma_1$ | [−2] | $KX_2^- = \alpha_2 - \gamma_2$ | [0] |
| Y | $KY_1^- = KY_2^- - \gamma_1$ | [0] | $KY_2^- = \alpha_1 + \alpha_2 - \gamma_2$ | [2] |
| Z | $KZ_1^- = KZ_2^- - \gamma_1$ | [−5] | $KZ_2^- = \alpha_2 - \beta_1 - \gamma_2/2$ | [−3] |
| W | $KW_1^- = KW_2^- - \gamma_1$ | [−1] | $KW_2^- = \alpha_2 + (\gamma_1 - \gamma_2 - \alpha_1)/2$ | [1] |

Note:
The positive and negative readback pulses are $(\ldots, 0, \alpha_1, \beta_1, \gamma_1, 0 \ldots)$ and $(\ldots, 0, -\alpha_2, -\beta_2, -\gamma_2, 0, \ldots)$ respectively. The nominal values are $\alpha_1 = \alpha_2 = 2$, $\beta_1 = \beta_2 = 4$, $\gamma_1 = \gamma_2 = 2$.

TABLE F

Modified Equations for Decoding

| | Positive Phase | | Negative Phase | |
|---|---|---|---|---|
| Precomputed Functions of Sample Values | Decision Boundary at State 1 0 0 | Decision Boundary at State 0 0 0 | Decision Boundary at State 0 1 1 | Decision Boundary at State 1 1 1 |

Baseline Check

| | | | | |
|---|---|---|---|---|
| $H_1 = y_0 + 2y_1 - 2y_3$ | $A_1 = (H_1 \leq KA_1^+)$ | $A_2 = (H_1 \leq KA_2^+)$ | $A_1' = (-H_1 \leq KA_1^-)$ | $A_2' = (-+1 \leq KA_2^-)$ |
| | $B_1 = (H_1 \leq KB_1^+)$ | $B_2 = (H_1 \leq KB_2^+)$ | $B_1' = (-H_1 \leq KB_1^-)$ | $B_2' = (-H_1 \leq KB_2^-)$ |
| $H_2 = y_0 + 2y_1 + y_2 - y_3 - 2y_4$ | $M_1 = M_2$ | $M_2 = (H_2 \leq KA_2^+)$ | $M_1' = M_2'$ | $M_2' = (-H_2 \leq KA_2^-)$ |
| | $C_1 = C_2$ | $C_2 = (H_2 < 0)$ | $C_1' = C_2'$ | $C_2' = (-H_2 \leq 0)$ |
| $H_3 = y_0 + 2y_1 + y_2 - y_4 - 2y_5$ | $N_1 = N_2$ | $N_2 = (H_3 \leq KA_2^+)$ | $N_1' = N_2'$ | $N_2' = (-H_3 \leq KA_2^-)$ |
| | $D_1 = D_2$ | $D_2 = (H_3 < 0)$ | $D_1' = D_2'$ | $D_2' = (-H_3 \leq 0)$ |
| $H_4 = y_0 + 2y_1 + y_2 - y_5 - 2y_6$ | $E_1 = E_2$ | $E_2 = (H_4 < 0)$ | $E_1' = E_2'$ | $E_2' = (-H_4 \leq 0)$ |
| $H_5 = y_0 + 2y_1 + y_2 - y_6 - 2y_7$ | $F_1 = F_2$ | $F_2 = (H_5 < 0)$ | $F_1' = F_2'$ | $F_2' = (-H_5 \leq 0)$ |

Peak Position Check

| | | | | |
|---|---|---|---|---|
| $H_6 = y_0 + y_1 - y_2 - y_3$ | $X_1 = (H_6 \leq KX_1^+)$ | $X_2 = (H_6 \leq KX_2^+)$ | $X_1' = (-H_6 \leq KX_1^-)$ | $X_2' = (-H_6 \leq KX_2^-)$ |
| | $Y_1 = (H_6 \leq KY_1^+)$ | $Y_2 = (H_6 \leq KY_2^+)$ | $Y_1' = (-H_6 \leq KY_1^-)$ | $Y_2' = (-H_6 \leq KY_2^-)$ |
| $H_7 = y_0 + y_1 - y_2 + 2y_4$ | $Z_1 = (H_7 \leq KZ_1^+)$ | $Z_2 = (H_7 \leq KZ_2^+)$ | $Z_1' = (-H_7 \leq KZ_1^-)$ | $Z_2' = (-H_7 \leq KZ_2^-)$ |
| $H_8 = y_0 + y_1 - y_2 + y_4 - y_5$ | $W_1 = (H_8 \leq KW_1^+)$ | $W_2 = (H_8 \leq KW_2^+)$ | $W_1' = (-H_8 \leq KW_1^-)$ | $W_2' = (-H_8 \leq KW_2^-)$ |

We claim:

1. A method of processing, in a signal processing channel, transducer-generated analog electrical signals representative of coded binary data into digital sample values, comprising the steps of:

with a clock, generating successive clock cycles;

with a decoder, precomputing values for the following functional expressions for a baseline check in accordance with an eight sample look ahead algorithm:

$H_1 = y_0 + 2y_1 - 2y_3$ $H_2 = y_0 + 2y_1 + y_2 - y_3 - 2y_4$ $H_3 = y_0 + 2y_1 + y_2 - y_4 - 2y_5$ $H_4 = y_0 + 2y_1 + y_2 - y_5 - 2y_6$ $H_5 = y_0 + 2y_1 + y_2 - y_6 - 2y_7$ where $y_0$ is a then current sample value, and $y_1$–$y_7$ are sample values in successive clock cycles following $y_0$; and with the decoder, also precomputing the values of the following functional expressions for a peak-position check:

$H_6 = y_0 + y_1 - y_2 - y_3$ $H_7 = y_0 + y_1 - y_2 + 2y_4$ $H_8 = y_0 + y_1 - y_2 + y_4 - y_5$;

using the decoder, executing said algorithm during each of a series of successive clock cycles to decode one successive bit of coded binary data corresponding to said current sample value and to advance to the next clock cycle with the computed next state as the new current state;

defining each clock cycle by a clock signal that is phase locked to said analog signal; and with an analog-to-digital converter, converting the incoming analog signal to said digital sample values at a rate of one sample value per clock cycle.

2. The method of claim 1, including during the executing step:
using comparators in the decoder for comparing said precomputed values against appropriate thresholds to provide respective binary decision outputs;
from said outputs in conjunction with state values corresponding to the current state, determining state values for the next state, which become the current state values for the next iteration of the clock cycle; and
during each of a series of successive clock cycles,
(a) decoding one successive bit of coded binary data corresponding to said sample value, and
(b) advancing to the next clock cycle with the computed next state as the new current state.

3. The method of claim 2, wherein the state values for the next state are determined without requiring a phase check.

4. The method of claim 2, including the step of:
generating a programmed value for each threshold.

5. The method of claim 2, including the step of:
computing each threshold from digitized parameters corresponding to the analog signal shape.

6. The method of claim 2, including the steps of:
fixing the values of at least some of the thresholds; and
generating programmed values for the remaining thresholds.

7. The method of claim 2, wherein, during the executing step, at least some of the values are compared against thresholds which are fixed near zero by examining the algebraic signs of such values.

8. The method of claim 2, including the step of
employing different thresholds for positive and negative phases of the analog signal shape as necessary to accommodate asymmetry of the signal shape.

9. The method of claim 2, including the steps of:
generating a programmed value for each threshold; and
programmably modifying values for the respective thresholds for different tracks on a disk of a disk file to optimize performance for all tracks.

10. The method of claim 2, including the steps of:
generating a programmed value for each threshold; and
programmably modifying values for the respective thresholds for accommodating signal dropouts caused by media defects on a magnetic recording tape in a tape recording system to optimize performance for all tracks.

11. The method of claim 2, wherein the binary data is in the form of a run-length-limited (1,7) code.

12. A signal processing channel comprising:
a phase-locked clock for generating successive clock cycles from an electronic clock signal that is phase locked to an incoming analog electrical signal representative of coded binary data;
an analog-to-digital converter for converting said incoming analog signal into digital electrical signals representing digital sample values; and
a decoder for processing said digital sample values to decode one successive bit of coded binary data at each successive clock cycle using an eight-sample look-ahead decoding algorithm that includes
(a) for a baseline check, the following functional expressions:

$H_1 = y_0 + 2y_1 - 2y_3$ $H_2 = y_0 + 2y_1 + y_2 - y_3 - 2y_4$ $H_3 = y_0 + 2y_1 + y_2 - y_4 - 2y_5$ $H_4 = y_0 + 2y_1 + y_2 - y_5 - 2y_6$ $H_5 = y_0 + 2y_1 + y_2 - y_6 - 2y_7$ where $y_0$ is a then current sample value, and $y_1 - y_7$ are sample values in successive clock cycles following $y_0$; and
(b) for a peak-position check, the following functional expressions:

$H_6 = y_0 + y_1 - y_2 - y_3$ $H_7 = y_0 + y_1 - y_2 + 2y_4$ $H_8 = y_0 + y_1 - y_2 + y_4 - y_5.$

13. The channel of claim 12, wherein the decoder comprises:
(a) precomputation circuitry that precomputes the values for the expressions for the baseline check and peak position check;
(b) comparators for comparing the precomputed values against appropriate thresholds to provide respective binary decision outputs;
(c) logic circuitry responsive to said outputs and to state values corresponding to the current state for determining state values for the next state, which become the current state values for the next iteration of the clock cycle; and
(d) other circuitry operative during each of a series of successive clock cycles to decode one successive bit of coded binary data corresponding to said current sample value and advance to the next clock cycle with the computed next state as the new current state.

14. The channel of claim 13, wherein said comparators compare at least some of the values against thresholds which are fixed near zero and the comparison is made by examining the algebraic signs of such values.

* * * * *

UNITED STATES PATENT AND TRADEMARK OFFICE
CERTIFICATE OF CORRECTION

PATENT NO. : 5,291,500
DATED : March 1, 1994
INVENTOR(S) : Arvind M. Patel, et al It is certified that error appears in the above-indentified patent and that said Letters Patent is hereby corrected as shown below:

Column 3, line 12, after 2A, insert -- 2A',

Column 3, line 12, after 2B, insert -- 2B', Column 3, line 50, after 2B, insert -- and 2B' --, Column 6, line 26, after 2B, insert -- and 2B' --.

Signed and Sealed this

Eighteenth Day of October, 1994

Attest:

BRUCE LEHMAN

*Attesting Officer*  *Commissioner of Patents and Trademarks*